(12) United States Patent
Zhang et al.

(10) Patent No.: US 12,151,325 B2
(45) Date of Patent: Nov. 26, 2024

(54) DOUBLE-SIDED ULTRASONIC ROLLING COOPERATIVE STRENGTHENING SYSTEM AND CONTROL METHOD THEREOF

(71) Applicant: EAST CHINA UNIVERSITY OF SCIENCE AND TECHNOLOGY, Shanghai (CN)

(72) Inventors: Xiancheng Zhang, Shanghai (CN); Jiawei Wang, Shanghai (CN); Lin Zhu, Shanghai (CN); Shantung Tu, Shanghai (CN); Kaiming Zhang, Shanghai (CN); Zhaoxing Sun, Shanghai (CN); Shuang Liu, Shanghai (CN); Huayi Cheng, Shanghai (CN); Junmiao Shi, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 18/681,015

(22) PCT Filed: Apr. 10, 2023

(86) PCT No.: PCT/CN2023/087266
§ 371 (c)(1),
(2) Date: May 28, 2024

(87) PCT Pub. No.: WO2024/021677
PCT Pub. Date: Feb. 1, 2024

(65) Prior Publication Data
US 2024/0326182 A1     Oct. 3, 2024

(30) Foreign Application Priority Data

Jul. 28, 2022 (CN) .......................... 202210894490.9

(51) Int. Cl.
*B21B 11/00* (2006.01)
*B21B 13/00* (2006.01)
(Continued)

(52) U.S. Cl.
CPC ................ *B23P 9/02* (2013.01); *B21B 11/00* (2013.01); *B21B 13/001* (2013.01); *B21B 13/14* (2013.01);
(Continued)

(58) Field of Classification Search
CPC .............. B21B 11/00; C21D 7/04; C21D 7/06
See application file for complete search history.

(56) References Cited

FOREIGN PATENT DOCUMENTS

| CN | 108330264 A | 7/2018 | |
| CN | 111842530 A | * 10/2020 | ............... B21B 1/16 |

(Continued)

OTHER PUBLICATIONS

Translation of CN-113832318 (Year: 2021).*
Translation of CN-111876570 (Year: 2020).*
Translation of CN-111842530 (Year: 2020).*

*Primary Examiner* — Bobby Yeonjin Kim
(74) *Attorney, Agent, or Firm* — Corner Counsel, LLC

(57) ABSTRACT

A double-sided ultrasonic rolling cooperative strengthening system and a control method thereof are provided. The system includes a first mechanical arm subsystem, a second mechanical arm subsystem, a first ultrasonic rolling strengthening subsystem, a second ultrasonic rolling strengthening subsystem and a servo turntable (13); the servo turntable (13) is configured to fix a blade to be processed; the first ultrasonic rolling strengthening subsystem is provided at an end of the first mechanical arm subsystem; and the second ultrasonic rolling strengthening subsystem is provided at an end of the second mechanical arm subsystem. The way that the mechanical arm is (Continued)

equipped with an ultrasonic rolling strengthening device improves a degree of freedom of processing the blade, and the first mechanical arm subsystem, the second mechanical arm subsystem, the first ultrasonic rolling strengthening subsystem, the second ultrasonic rolling strengthening subsystem and the servo turntable (13) are provided to cooperate to realize double-sided processing.

20 Claims, 8 Drawing Sheets

(51) Int. Cl.
  *B21B 13/14* (2006.01)
  *B23P 9/02* (2006.01)
  *C21D 7/04* (2006.01)
  *C22F 1/00* (2006.01)
  *C22F 3/00* (2006.01)
(52) U.S. Cl.
  CPC ............ *C21D 7/04* (2013.01); *C22F 1/00* (2013.01); *C22F 3/00* (2013.01)

(56) References Cited

FOREIGN PATENT DOCUMENTS

| | | | | |
|---|---|---|---|---|
| CN | 111876570 A | * | 11/2020 | ............ C21D 7/04 |
| CN | 113832318 A | * | 12/2021 | |
| CN | 113981188 A | | 1/2022 | |
| CN | 115369223 A | | 11/2022 | |
| DE | 102006053845 A1 | | 5/2008 | |

\* cited by examiner

DOUBLE-SIDED ULTRASONIC ROLLING COOPERATIVE STRENGTHENING SYSTEM AND CONTROL METHOD THEREOF

This application claims the priority of Chinese Patent Application No. 202210894490.9 filed to China National Intellectual Property Administration on Jul. 28, 2022 and entitled as "Double-sided ultrasonic rolling cooperative strengthening system and control method thereof", the disclosure of which is incorporated by reference herein in its entirety.

TECHNICAL FIELD

The present disclosure relates to the technical field of processing parts, in particular to a double-sided ultrasonic rolling cooperative strengthening system and a control method thereof.

BACKGROUND

Due to a long production cycle and a high test cost of an aero-engine, a large amount of cost needs to be invested in research and development before the production and manufacturing of aero-engines reach the standard. With the continuous development of aviation technology, an aero-engine must meet the requirements of an ultra-high speed, a high altitude, a long endurance and an ultra-long voyage, and the aero-engine should be able to operate in a harsh working environment of a high temperature, a high pressure and a high speed, which is short in life cycle and easy to produce various defects, such as cracks, wear, distortion and so on, and is a typical life-limiting component. Compared with replacing a blade after a certain stroke, it is more economical and safe to improve the service life of the blade. A compressor blade of the engine belongs to a thin-walled complex curved surface part, which is easy to deform in the strengthening process because of its low stiffness, so that its service life is affected. Therefore, it is necessary to reduce the deformation during processing as much as possible.

The ultrasonic rolling strengthening technology is a new surface strengthening technology, the principle thereof is that under the combined action of the static pressure and the high-frequency and high-speed ultrasonic vibration, the surface of the material is plastically deformed, which refines the surface layer of the part, improves the hardness of the metal surface layer, overcomes the shortcomings of the traditional technology in this respect, and introduces beneficial residual compressive stress, thus improving the surface quality and prolonging the service life of the part. Compared with traditional processes such as grinding and polishing, the ultrasonic rolling technology is simpler and more efficient in principle and operation, and has a great influence on the surface quality of a workpiece. However, the ultrasonic rolling technology is still in the stage of experimental exploration, and is mostly applied on parts with regular shapes so as to test the parameters and effects of the parts. A processing device mainly integrates an ultrasonic strengthening system on the existing lathe, and there is little research on the strengthening processing of a complex curved surface of a blade. Due to the limited degree of freedom of a machine tool equipped with a processing head, it is easy to cause interference between the processing head and other portions of the blade and result in incomplete strengthening of the part or accidental scratches and damage. Moreover, at present, most of the surface strengthening methods uses a one-sided processing manner, which is easy to cause the compressor blade to be deformed by a contact force.

SUMMARY

In view of this, some embodiments provide a double-sided ultrasonic rolling cooperative strengthening system and a control method thereof, so as to overcome the technical defect that it is easy to cause interference between the processing head and other parts of the blade and result in incomplete strengthening of the parts or accidental scratches and damage due to the limited degree of freedom of a machine tool equipped with a processing head, and realize double-sided processing.

In order to achieve the above purpose, some embodiments provide the following scheme.

A double-sided ultrasonic rolling cooperative strengthening system is provided, where the system includes a first mechanical arm subsystem, a second mechanical arm subsystem, a first ultrasonic rolling strengthening subsystem, a second ultrasonic rolling strengthening subsystem and a servo turntable;

the servo turntable is configured to fix a blade to be processed;

the first ultrasonic rolling strengthening subsystem is provided at an end of the first mechanical arm subsystem;

the second ultrasonic rolling strengthening subsystem is provided at an end of the second mechanical arm subsystem;

the first mechanical arm subsystem is configured to drive the first ultrasonic rolling strengthening subsystem to carry out strengthening processing on one side of the blade, and the second mechanical arm subsystem is configured to drive the second ultrasonic rolling strengthening subsystem to carry out strengthening processing on an other side of the blade.

Preferably, each of the first mechanical arm subsystem and the second mechanical arm subsystem includes a six-degree-of-freedom mechanical arm.

Preferably, a six-component force sensor is provided between the first mechanical arm subsystem and the first ultrasonic rolling strengthening subsystem, and an other six-component force sensor is provided between the second mechanical arm subsystem and the second ultrasonic rolling strengthening subsystem.

Preferably, each of the first ultrasonic rolling strengthening subsystem and the second ultrasonic rolling strengthening subsystem includes an ultrasonic rolling tool head and an ultrasonic generator;

the ultrasonic generator is connected with an ultrasonic transducer in the ultrasonic rolling tool head, and the ultrasonic generator is configured to generate a signal with a preset frequency.

Preferably, the ultrasonic rolling tool head includes a sleeve, a transducer pressure plate, the ultrasonic transducer, an amplitude transformer, a holder and a roller;

the sleeve is connected with the six-component force sensor provided between the first mechanical arm subsystem and the first ultrasonic rolling strengthening subsystem and with the other six-component force sensor provided between the second mechanical arm subsystem and the second ultrasonic rolling strengthening subsystem through bolts, a driving end of the ultrasonic transducer is connected with the ultrasonic generator, and an mechanical energy output end of the ultrasonic transducer is connected with one end of the amplitude transformer through a double headed bolt;

the driving end of the ultrasonic transducer is located in the sleeve, and the transducer pressure plate is connected with the sleeve through a bolt for limiting relative movement between the ultrasonic transducer and the sleeve;

an other end of the amplitude transformer is connected with the roller through the holder.

Preferably, the system further includes a strengthening fixture;

the servo turntable is configured to fix the blade through the strengthening fixture.

Preferably, a bottom of the strengthening fixture is provided with a cross-shaped clamping groove, the cross-shaped clamping groove is aligned with a cross-shaped claw provided on the servo turntable and is fixed with the cross-shaped claw through a bolt;

a top of the strengthening fixture is provided with a groove, a first threaded hole is provided at a top surface around the groove, a second threaded hole is provided at a side surface of the groove; the top of the strengthening fixture is further provided with a gland, and a center of the gland is provided with a through hole;

during operation, a tenon root of the blade is provided in the groove, the gland is fastened with the first threaded hole through a bolt, the blade passes through the through hole, the gland is configured to limit movement of the blade in a Z-axis direction; a bolt is screwed into the second threaded hole for limiting movement of the blade in an X-axis direction and a Y-axis direction; the Z-axis direction is a strengthening feeding direction, the X-axis direction is a thickness direction of the blade, and the Y-axis direction is a direction perpendicular to the Z-axis direction and the X-axis direction.

A control method of a double-sided ultrasonic rolling cooperative strengthening system is provided, where the method is applied to the double-sided ultrasonic rolling cooperative strengthening system described above, and the method includes the following steps:

fixing the blade to be processed on the servo turntable;

generating a first mechanical arm motion trajectory and a second mechanical arm motion trajectory according to a three-dimensional model of the blade;

controlling an action of the first mechanical arm subsystem according to the first mechanical arm motion trajectory;

controlling an action of the second mechanical arm subsystem according to the second mechanical arm motion trajectory;

determining processing depths of both sides of the blade as a first processing depth and a second processing depth, respectively, according to the three-dimensional model of the blade;

controlling an action of the first ultrasonic rolling strengthening subsystem according to the first processing depth;

controlling an action of the second ultrasonic rolling strengthening subsystem according to the second processing depth.

Preferably, generating the first mechanical arm motion trajectory and the second mechanical arm motion trajectory according to the three-dimensional model of the blade specifically includes following steps:

layering the three-dimensional model by taking data points with same numerical values in a Z axis as a layer;

dividing the data points of each layer into first plane data points and second plane data points according to a numerical value in a Y axis, where the first plane data points are data points located on the one side of the blade, and the second plane data points are data points located on the other side of the blade;

calculating first time points for the first plane data points when the end of the first mechanical arm subsystem moves to each of the first plane data points and calculating first time points for the second plane data points when the end of the second mechanical arm subsystem moves to each of the second plane data points, respectively;

inserting multiple second time points for the first plane data points between two adjacent first time points of the first time points for the first plane data points, and inserting multiple second time points for the second plane data points between two adjacent first time points of the first time points for the second plane data points;

forming the first mechanical arm motion trajectory of a layer where the first plane data points are located by the first time points for the first plane data points and the second time points for the first plane data points;

forming the second mechanical arm motion trajectory of a layer where the second plane data points are located by the first time points for the second plane data points and the second time points for the second plane data points.

Preferably, controlling the action of the first ultrasonic rolling strengthening subsystem according to the first processing depth specifically includes following steps:

obtaining pressure data acquired by a six-component force sensor provided between the first mechanical arm subsystem and the first ultrasonic rolling strengthening subsystem;

performing gravity compensation on the pressure data by using the following formula to obtain compensated pressure data;

$$F_m'(t)=F_m(t)-g_2-F_0;$$

where $F_m'(t)$ is the compensated pressure data, $F_m(t)$ is the acquired pressure data, t indicates a sampling time point, $g_2$ is a component of a gravity of the first ultrasonic rolling strengthening subsystem in a sensor coordinate system, and $F_0$ is a zero value of the six-component force sensor provided between the first mechanical arm subsystem and the first ultrasonic rolling strengthening subsystem;

controlling the action of the first ultrasonic rolling strengthening subsystem by using following formula according to the compensated pressure data and the first processing depth based on a principle of constant force coordination control;

$$M(\ddot{x}-\ddot{x}_d)+B(\dot{x}-\dot{x}_d)+K(x-x_d)=F_d(t)-F_m'(t)=F_e;$$

where M, B and K are all coefficient matrices, X is a displacement in the X-axis direction, $x_d$ is an expected displacement determined by the first processing depth, $F_d(t)$ is an expected pressure in the constant force coordination control.

According to the specific embodiment provided by the present disclosure, the present disclosure discloses the following technical effects.

The present disclosure discloses a double-sided ultrasonic rolling cooperative strengthening system and a control method thereof are provided. The system includes a first mechanical arm subsystem, a second mechanical arm subsystem, a first ultrasonic rolling strengthening subsystem, a second ultrasonic rolling strengthening subsystem and a servo turntable; the servo turntable is configured to fix a blade to be processed; the first ultrasonic rolling strengthening subsystem is provided at an end of the first mechanical arm subsystem; and the second ultrasonic rolling strengthening subsystem is provided at an end of the second mechanical arm subsystem; the first mechanical arm subsystem is configured to drive the first ultrasonic rolling strengthening subsystem to carry out strengthening processing on one side of the blade, and the second mechanical arm subsystem is configured to drive the second ultrasonic rolling strengthening subsystem to carry out strengthening processing on the other side of the blade. According to the present disclosure, the way that the mechanical arm is equipped with an ultrasonic rolling strengthening device improves a degree of freedom of processing the blade, and the first mechanical arm subsystem, the second mechanical arm subsystem, the first ultrasonic rolling strengthening subsystem, the second ultrasonic rolling strengthening subsystem and the servo turntable are provided to cooperate to realize double-sided processing.

BRIEF DESCRIPTION OF THE DRAWINGS

In order to explain the embodiments of the present disclosure or the technical schemes in the prior art more clearly, the accompanying drawings that need to be used in the embodiments will be briefly introduced hereinafter. Obviously, the accompanying drawings in the following description are only some embodiments of the present disclosure. For those skilled in the art, other drawings can be obtained according to these drawings without creative labor.

DETAILED DESCRIPTION OF THE EMBODIMENTS

The technical schemes in the embodiments of the present disclosure will be clearly and completely described with reference to the accompanying drawings in the embodiments of the present disclosure hereinafter. Obviously, the described embodiments are only some embodiments of the present disclosure, rather than all of the embodiments. Based on the embodiment of the present disclosure, all other embodiments obtained by those skilled in the art without creative labor belong to the scope of protection of the present disclosure.

The purpose of the present disclosure is to provide a double-sided ultrasonic rolling cooperative strengthening system and a control method thereof, so as to overcome the technical defect that it is easy to cause interference between the processing head and other parts of the blade and result in incomplete strengthening of the parts or accidental scratches and damage due to the limited degree of freedom of a machine tool equipped with a processing head, and realize double-sided processing.

In order to make the above purpose, features and advantages of the present disclosure more obvious and understandable, the present disclosure will be explained in further detail with reference to the accompanying drawings and detailed description hereinafter.

Embodiment 1

Figure 1:
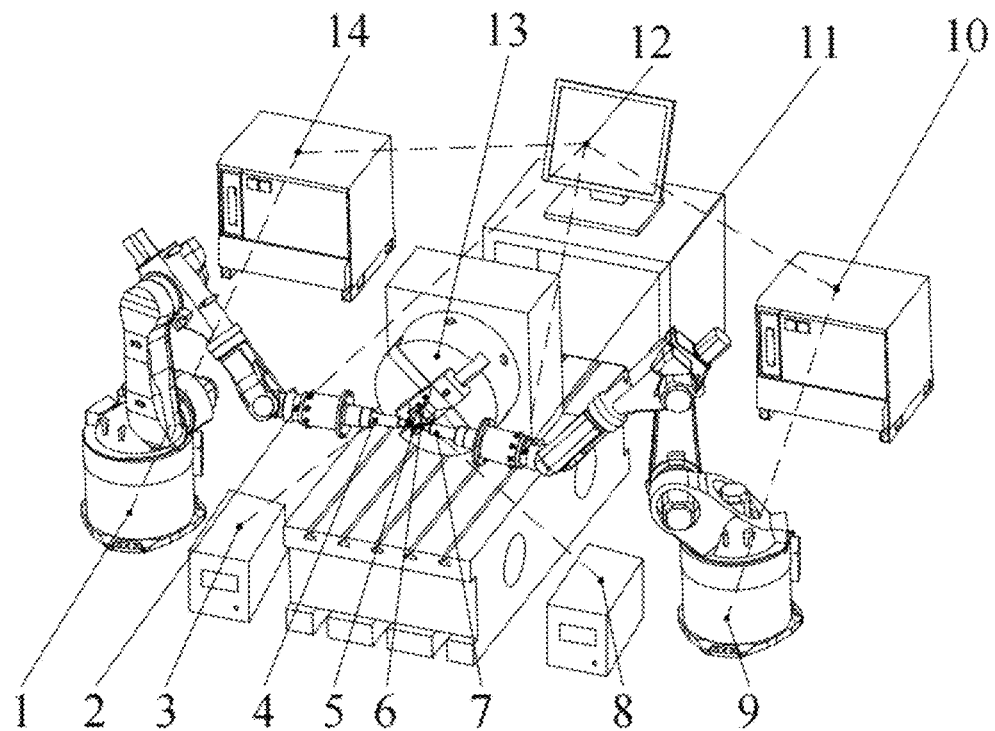
FIG. 1 is a schematic structural diagram of a double-sided ultrasonic rolling cooperative strengthening system according to an embodiment of the present disclosure.

As shown in FIG. 1, Embodiment 1 of the present disclosure provides a double-sided ultrasonic rolling cooperative strengthening system, where the system includes a first mechanical arm subsystem, a second mechanical arm subsystem, a first ultrasonic rolling strengthening subsystem, a second ultrasonic rolling strengthening subsystem and a servo turntable 13; the servo turntable is configured to fix a blade to be processed; the first ultrasonic rolling strengthening subsystem is provided at an end of the first mechanical arm subsystem; the second ultrasonic rolling strengthening subsystem is provided at an end of the second mechanical arm subsystem; the first mechanical arm subsystem is configured to drive the first ultrasonic rolling strengthening subsystem to carry out strengthening processing on one side of the blade, and the second mechanical arm subsystem is configured to drive the second ultrasonic rolling strengthening subsystem to carry out strengthening processing on the other side of the blade.

The first mechanical arm subsystem includes a first six-degree-of-freedom mechanical arm 1. The second mechanical arm subsystem includes a second six-degree-of-freedom mechanical arm 9. The first ultrasonic rolling strengthening subsystem includes a first ultrasonic generator 3 and a first ultrasonic rolling tool head 4. The second ultrasonic rolling strengthening subsystem includes a second ultrasonic generator 8 and a second ultrasonic rolling tool head 7. A first six-component force sensor 2 is provided between the first six-degree-of-freedom mechanical arm 1 and the first ultrasonic rolling tool head 4, and a second six-component force sensor 11 is provided between the second six-degree-of-freedom mechanical arm 9 and the second ultrasonic rolling tool head 7. The blade 5 to be processed is provided on the servo turntable 13 through the strengthening fixture 6. The dotted lines between an upper computer 12 and each of a first robot control cabinet 14, a second robot control cabinet 10, the servo turntable 13 indicates electrical connection or communication connection.

1. The Six-Degree-of-Freedom Mechanical Arms Include a First Six-Degree-of-Freedom Mechanical Arm 1 and a Second Six-Degree-of-Freedom Mechanical Arm 9.

As an executive mechanism of the whole system, the equipped ultrasonic rolling tool head (including the first ultrasonic rolling tool head 4 and the second ultrasonic rolling tool head 7) can move in six degrees of freedom in space, so as to realize the trajectory motion for ultrasonic rolling strengthening.

2. A Robot Control Cabinet

The robot control cabinet is the control mechanism of the six-degree-of-freedom mechanical arm and is connected with the body of the six-degree-of-freedom mechanical arm through a cable, which can supply power for the six-degree-of-freedom mechanical arm and drive all joints of the six-degree-of-freedom mechanical arm to move. Communication is established between the robot control cabinet and the upper computer through network cables. In FIG. 1, the communication connection between the upper computer 12 and force sensors (including the first six-component force sensor 2 and the second six-component force sensor 11) is indicated by dotted lines.

3. A Servo Turntable

The servo turntable mainly includes a servo motor, a reducer and a cross-shaped chuck. The servo motor is driven to be connected with the reducer to drive the cross-shaped chuck to rotate.

4. An Ultrasonic Rolling Tool Head Includes a First Ultrasonic Rolling Tool Head 4 and a Second Ultrasonic Rolling Tool Head 7.

Ultrasonic rolling processing is a working method of ultrasonic impact combined with static load rolling. The ultrasonic rolling tool head transmits the static pressure and the vibration provided by the ultrasonic generator to the surface of mechanical parts to process the surface of metal parts, thus improving the surface effect of the parts. This method is a more efficient processing method. The structure of the ultrasonic rolling tool head shown in FIG. 2 includes a sleeve 402, a transducer pressure plate 403, an ultrasonic transducer 404, an amplitude transformer 407, a holder 408 and a roller 409.

Figure 2:
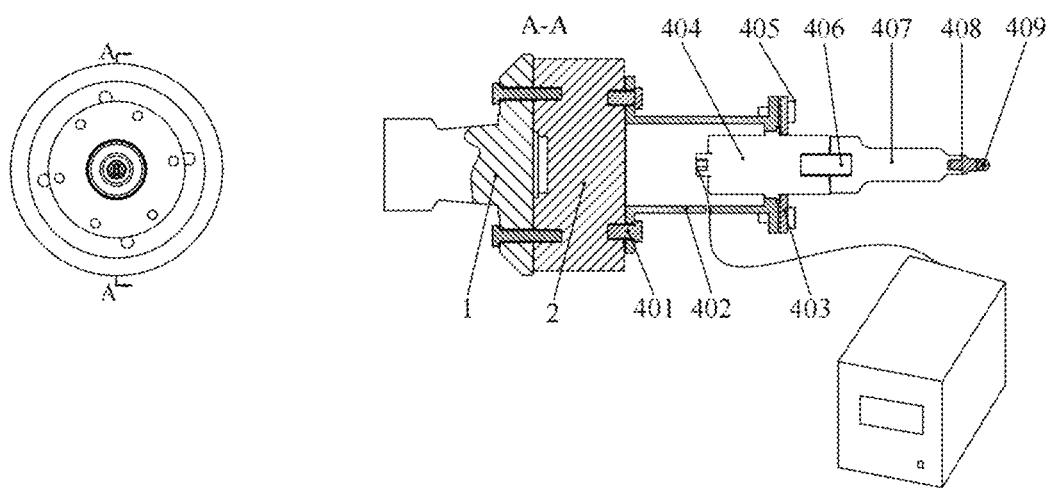
FIG. 2 is a schematic structural diagram of an ultrasonic rolling tool head according to an embodiment of the present disclosure.

For example, as shown in FIG. 2, the ultrasonic rolling tool head is connected with the first six-component force sensor 2 by a sleeve 402 through a first bolt 401. The ultrasonic transducer 404 is the vibration source of the whole processing head, which is connected with the ultrasonic generator and can convert the electric energy generated by the ultrasonic generator 3 into the mechanical energy of high-frequency vibration. The present disclosure selects a relatively simple cylindrical transducer, which is convenient to install and low in cost. The transducer pressure plate 403 is configured to fix the ultrasonic transducer 404. The sleeve 402 and the transducer pressure plate 403 are connected through a second bolt 405 to fix the position of the ultrasonic transducer 404 in the whole ultrasonic rolling tool head. The amplitude transformer 407 is configured to transmit and amplify the mechanical energy of ultrasonic vibration. The particle displacement or speed of mechanical vibration can be amplified through the amplitude transformer, which is usually used in combination with the transducer. The amplitude transformer is connected between the transducer and the tool head, which can amplify the mechanical amplitude to the requirements. The amplitude transformer 407 in the present disclosure uses a stepped amplitude transformer. One section of the amplitude transformer 407 has a threaded hole with the same size as a threaded hole of the ultrasonic transducer 404, and the amplitude transformer 407 and the ultrasonic transducer 404 are connected together through the double headed bolt 406. The holder 408 is configured to connect the amplitude transformer 407 and the roller 409. The top end of the amplitude transformer 407 is provided with a threaded hole, the holder 408 can be fastened though the thread hole and integrated with the amplitude transformer 407. In other ultrasonic rolling heads with balls, the gap between the rolling head and the amplitude transformer 407 needs to be adjusted manually according to experience. An improper gap will affect the strengthening effect of the blade surface, but the present disclosure avoids the error and uncertainty of adjusting the gap.

5. The Ultrasonic Generator Includes a First Ultrasonic Generator 3 and a Second Ultrasonic Generator 8.

As the driving power supply and the control part of the ultrasonic vibration system, the ultrasonic generator is an important part of a high-power ultrasonic system. The output of the ultrasonic generator is connected with the ultrasonic transducer 404 in the ultrasonic rolling tool head through electrical connection, as shown in FIG. 2, the ultrasonic generator can convert 50 Hz commercial power into high-frequency current suitable for the ultrasonic transducer. Considering the conversion efficiency, the ultrasonic power supply usually uses a circuit form of switching power supply. In the operating state, the ultrasonic generator will generate a special-frequency signal, which will generate sine or pulse signals according to different requirements. This specific frequency is the operating frequency of the transducer.

6. A Six-Component Force Sensor

The six-component force sensor can read the forces and moments in the X direction, the Y direction, and Z direction in space, and can be configured to read the acting force between the ultrasonic rolling tool head and the parts in the strengthening process. For example, as shown in FIG. 2, the first six-component force sensor 2 is connected with the flange at the end of the first six-degree-of-freedom mechanical arm 1 through a bolt. The six-component force sensor in the embodiment of the present disclosure carries a controller for signal acquisition, A/D conversion, signal processing and communication, and establishes communication between the controller and the upper computer by using a network cable. In FIG. 1, the communication connection between the upper computer 12 and each of the first six-component force sensor 2 and the second six-component force sensor 11 is indicated by a dotted line.

7. A Strengthening Fixture

Figure 3:
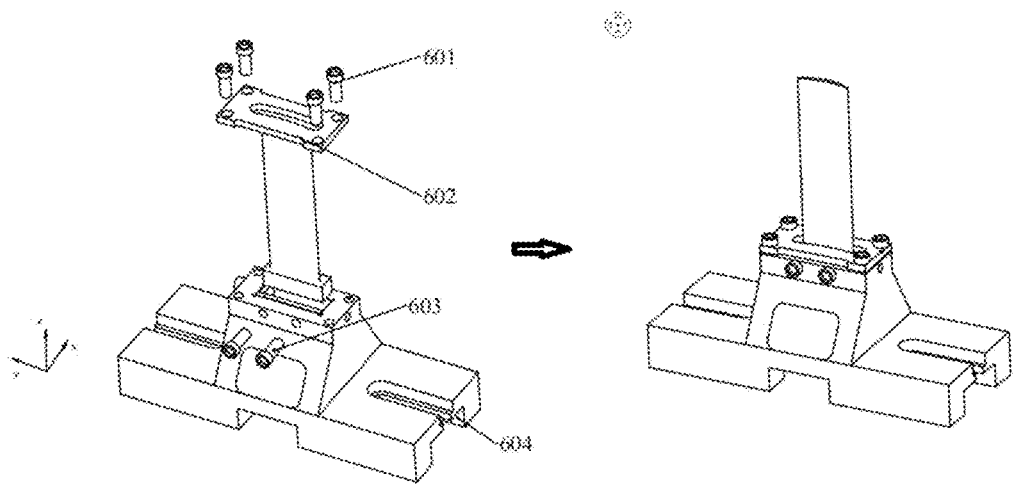
FIG. 3 is a schematic structural diagram of a strengthening fixture according to an embodiment of the present disclosure.
Figure 4:
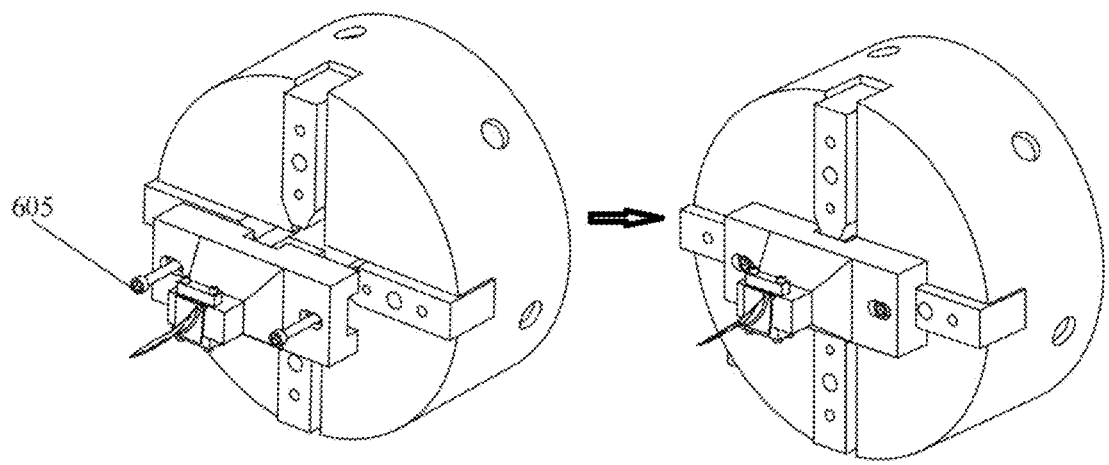
FIG. 4 is an installation schematic diagram of a strengthening fixture according to an embodiment of the present disclosure.

The strengthening fixture 6 is configured to clamp the blade 4 and maintain the position of the blade. The structure thereof is shown in FIG. 3. The bottom of the strengthening fixture 6 is provided with a cross-shaped clamping groove 604. The cross-shaped clamping groove 604 is first aligned with a cross-shaped claw provided on the servo turntable 13. As shown in FIG. 4, the cross-shaped claw is provided with a bolt hole. By adjusting the expansion or contraction of the claw, a third bolt 605 passing through the bolt hole of the strengthening fixture 6 is aligned with the bolt hole of the cross-shaped claw, and fixes the strengthening fixture 6 on the servo turntable 13. The tenon root of the blade is put into the groove. The gland 602 is fastened with the strengthening fixture 6 through four fourth bolts 601 to ensure that the blade does not move in the Z direction shown in FIG. 3. A fifth bolt 603 on the XY plane shown in FIG. 3 is screwed to ensure that the blade does not move in the X and Y directions.

8. An Upper Computer

The upper computer 12 is configured to establish mutual communication with the six-degree-of-freedom mechanical arm and the six-component force sensor, and can display the change of related information of the six-degree-of-freedom mechanical arm and the six-component force sensor in the strengthening process, and send corresponding data and instructions to control the movement of the mechanical arm through the upper computer 12. The specific connection method is as follows: first, the strengthening fixture 6 is fixed on the cross-shaped jaw according to the above installation method, and the blade 5 is fixed on the strengthening fixture 6 by the fourth bolt 601 and the fifth bolt 603 in two directions. After the fixing, the initial posture of the blade 5 can be adjusted by controlling the servo turntable 13. The first six-component force sensor 2 is connected to the end of the first six-degree-of-freedom mechanical arm 1 through a flange and a bolt. Thereafter, the sleeve 402 in the first ultrasonic rolling tool head 4 is fixed on the first six-component force sensor 2 through a bolt. The ultrasonic transducer 404 and the amplitude transformer 407 are fastened through a double headed bolt 406 and then put into the sleeve 402, and subsequently, are fixed through a transducer pressure plate 403 by a second bolt 405. Finally, the holder 408 carrying the roller 409 is screwed into the bolt hole at the top end of the amplitude transformer 407 and is fastened, so as to complete the installation of the ultrasonic rolling tool head. The connecting wire of the ultrasonic transducer 404 is connected with the corresponding wire of the ultrasonic generator. The configuration of the second six-degree-of-freedom mechanical arm 9 is the same as that of the first six-degree-of-freedom mechanical arm 1. The first six-degree-of-freedom mechanical arm 1 and the second six-degree-of-freedom mechanical arm 9 are separately fixed on both sides of the servo turntable 13 to keep a certain distance therefrom to facilitate the operation of the mechanical arm. Finally, the mechanical arm control cabinet and the six-component force sensor are connected to the upper computer 12 through a network cable to complete the hardware connection of the whole system. Through the cooperative movement of the first six-degree-of-freedom mechanical arm 1 and the second six-degree-of-freedom mechanical arm 9, the ultrasonic rolling strengthening processing of the double surfaces of the blade is realized.

Embodiment 2

Figure 5:
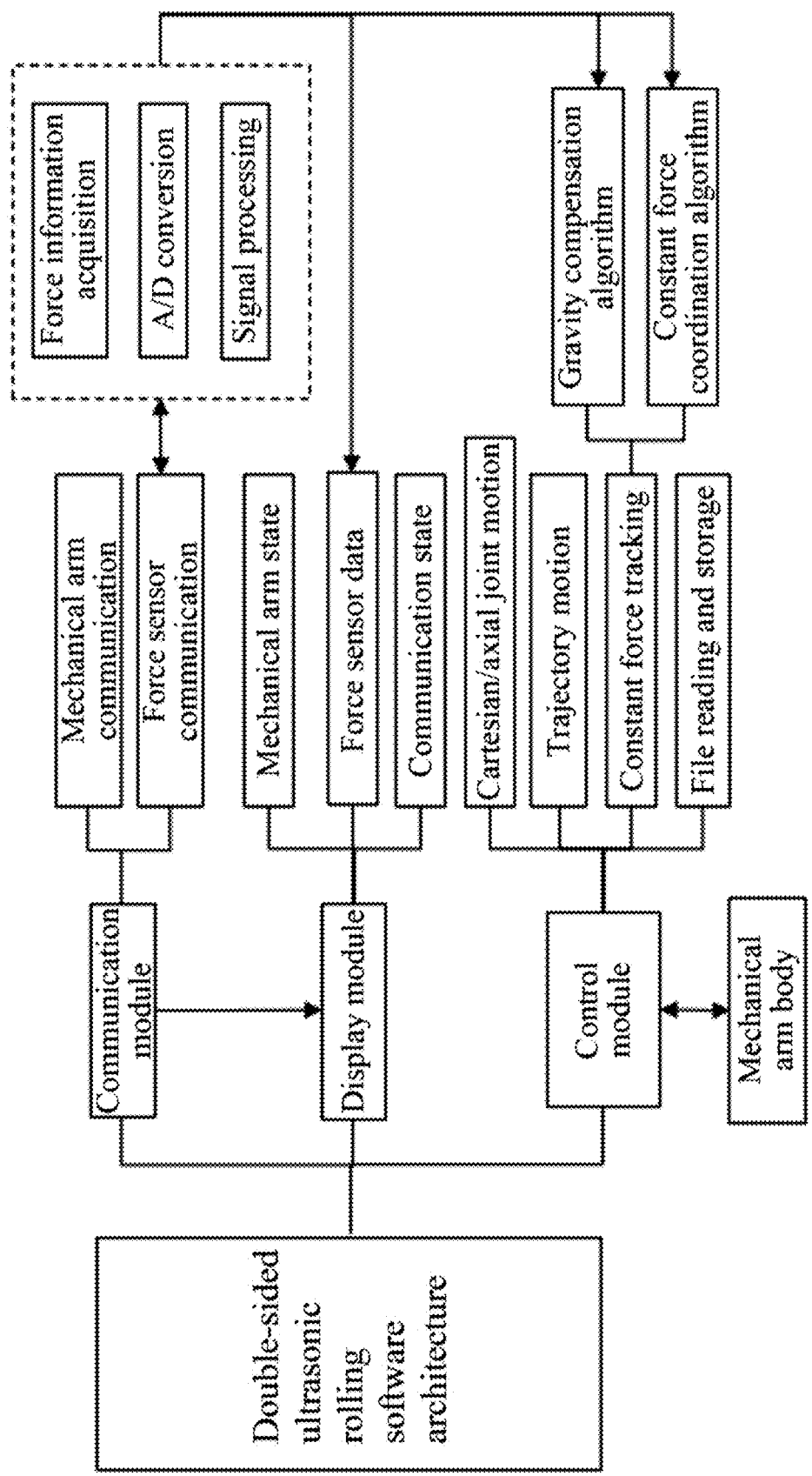
FIG. 5 is a schematic structural diagram of an overall frame of a control method of a double-sided ultrasonic rolling cooperative strengthening system according to an embodiment of the present disclosure.

Embodiment 2 of the present disclosure provides a control method of a double-sided ultrasonic rolling cooperative strengthening system. The present disclosure relates to the field of robot control. Specifically, the upper computer communicates with a six-degree-of-freedom mechanical arm and a six-component force sensor through UDP communication, so as to realize real-time control and adjustment of the six-degree-of-freedom mechanical arm in the ultrasonic rolling strengthening process. The overall architecture thereof is shown in FIG. 5.

Figure 6:
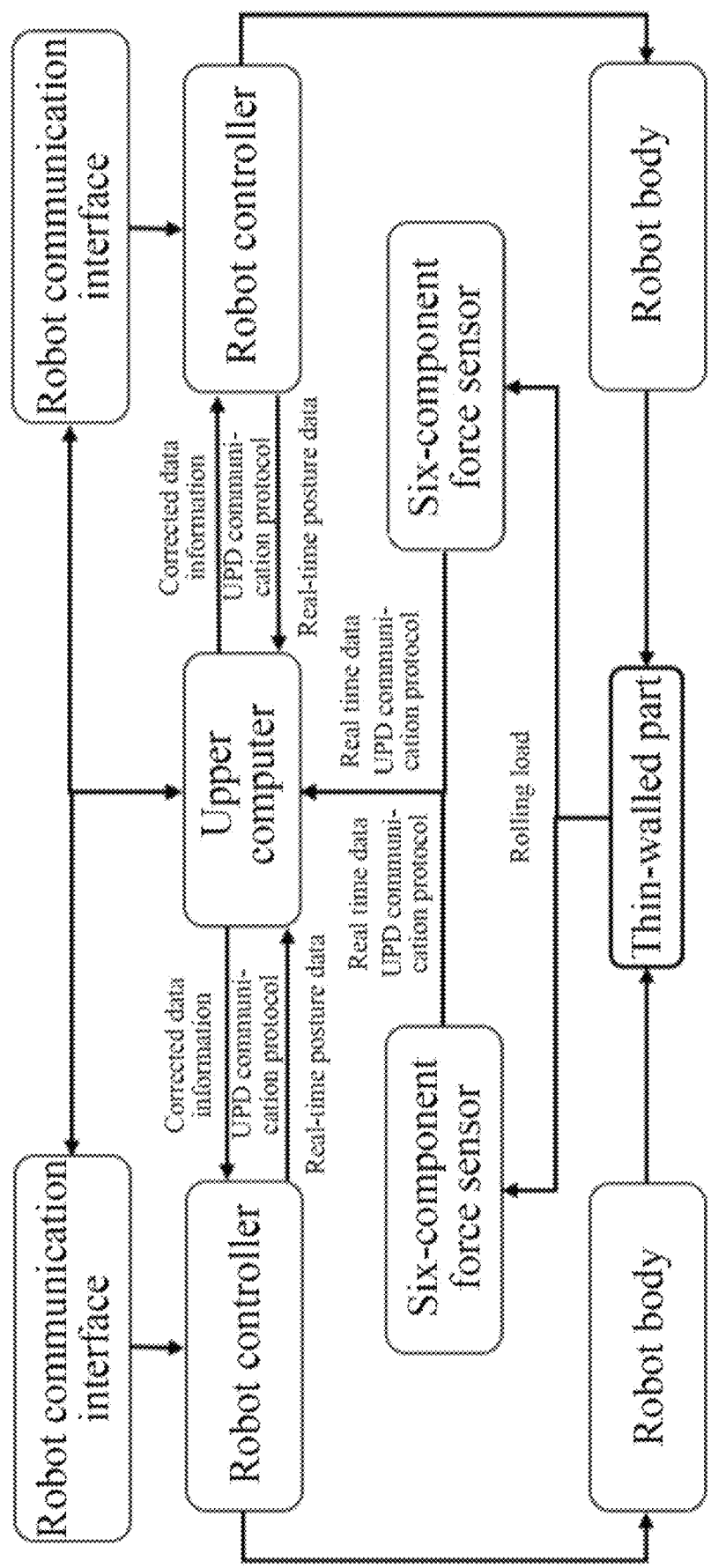
FIG. 6 is a schematic structural diagram of a communication scheme according to an embodiment of the present disclosure.

The communication module physically connects the upper computer with the six-degree-of-freedom mechanical arm and the six-component force sensor by a network cable, and establishes communication with the six-degree-of-freedom mechanical arm and the six-component force sensor through a UDP communication protocol to realize two-way data transmission. The more specific system communication scheme is shown in FIG. 6. By setting the configuration file for communication with the six-degree-of-freedom mechanical arm and the six-component force sensor, the communication connection between the upper computer and the whole system can be realized, so as to obtain the current state of the six-degree-of-freedom mechanical arm, such as Cartesian position in the current coordinate system, the position of each axis joint, the data of the six-component force sensor through A/D conversion, the movement mode and the communication state.

The data values obtained through the communication module are displayed on the upper computer in real time through a display module, in which the movement mode indicates that there will be corresponding state in the control module according to different control modes. In the display module, the data values of the six-component force sensor can also be drawn into a graph, which can be intuitively known about the change of the acting load in the current work.

Basic motion, such as Cartesian coordinate system motion and axis joint motion, is set in the control module. The mechanical arm can be controlled to move to the designated position by inputting specific coordinate or joint data. The trajectory motion can obtain trajectory motion data by reading files. The mechanical arm moves along the expected trajectory through trajectory motion control.

The method is applied to the double-sided ultrasonic rolling cooperative strengthening system, and the method includes the following steps.

A blade to be processed is fixed on a servo turntable.

A first mechanical arm motion trajectory and a second mechanical arm motion trajectory are generated according to a three-dimensional model of the blade.

The surface trajectory planning method specifically includes the following steps.

The surface strengthening trajectory planning method of the blade to be processed uses the combination of a UG software CAM module with MATLAB to generate txt data files that can be read by the control module. The whole generation method includes the following steps:

1, importing the three-dimensional model of the blade to obtain specific data;
2, setting parameters of workpieces such as a coordinate system and a cutting tool;
3, setting the strengthening area and the interval;
4, generating the initial tool location point and the cutter-contact point;
5, reading the initial trajectory by MATLAB;
6, carrying out secondary processing to optimize the trajectory and generating the mechanical arm motion trajectory.

Although the trajectory points of each layer can be set in the UG, the surface of the blade is irregular, which will lead to uneven density. In order to ensure the speed requirement and continuity in the movement process, it is necessary to carry out secondary processing, and finally output the position data XYZ and posture data ABC that can be recognized by the mechanical arm and save the position data XYZ and posture data ABC in TXT files.

Specifically, in order to obtain the final motion trajectory through the initial trajectory, first, the direction is set according to the coordinate system in FIG. 3, where X is the thickness direction of a thin wall, and Z is the strengthening feeding direction.

Figure 7:
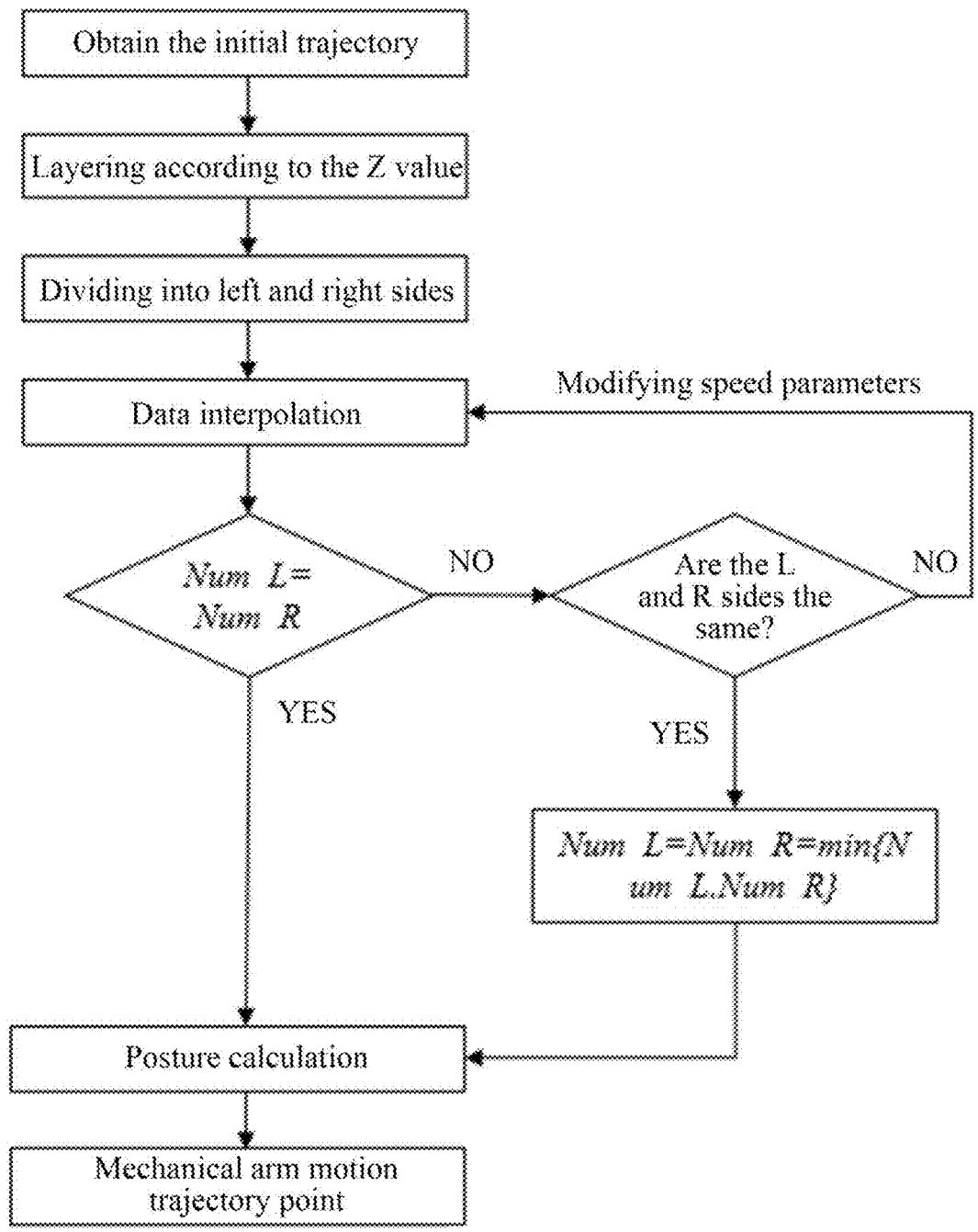
FIG. 7 is a flowchart of trajectory secondary processing optimization according to an embodiment of the present disclosure.
Figure 8:
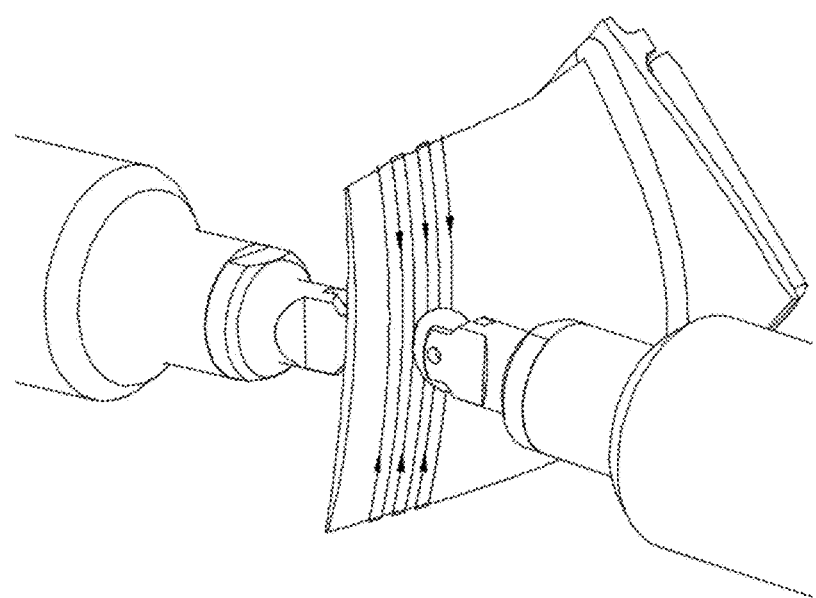
FIG. 8 is a schematic diagram of a strengthening processing path according to an embodiment of the present disclosure.

All data points generated by the UG software are taken as initial trajectory points, and the next secondary processing of data is read by the MATLAB. The schematic diagram of the strengthening processing path is shown in FIG. 8. The optimization process of the trajectory secondary processing is shown in FIG. 7. First, the obtained data points are layered according to the numerical value changes in the Z direction, and the data with the same numerical value in the Z direction are taken as trajectory points of the same layer. In order to meet the requirements of process parameters, each point needs to be redistributed. First, all data points of this layer are traversed, and the data of each layer are from the maximum value to the minimum value of Y and then from the minimum value to the maximum value. Since the value of Y in each layer has only two maximum values and two minimum values, the subscripts of the two maximum values and the two minimum values are recorded, and the adjacent subscripts are the division points of two surfaces. The trajectory of a layer is divided into two surfaces, the L surface and the R surface. The coordinates of the two surfaces on the same layer are set as $x_l$, $y_l$, $x_r$, $y_r$. The distance formula $d_i=\sqrt{(x_i-x_{i-1})^2+(y_i-y_{i-1})^2}$ is used to obtain the distance between adjacent points. According to the required movement speed v, the required time sequence $t_i$ from the starting point to each data point is calculated. The time sequence $t_i$ is divided into a new time sequence $t_j$ according to the communication frequency $\Delta t$ between the upper computer and the six-degree-of-freedom mechanical arm. The known coordinate values corresponding to several points $t_i$ are used to make appropriate specific functions, and then linear interpolation is carried out to calculate a new coordinate point sequence $x_l'$, $y_l'$, $x_r'$, $y_r'$ according to the new value $t_j$. If the surfaces of the L surface and the R surface are consistent, it is judged whether the numbers Num_L and Num_R of $x_l'$, $y_l'$, $x_r'$, $y_r'$ trajectory points after interpolation are equal. If there are slight differences, in order to ensure the synchronous operation of both sides, the small number is taken as the standard. If the surfaces on both sides are not equal to each other, the equal proportional speed is set according to the length ratio of the trajectories on both sides for interpolation, and the obtained trajectory is shown in FIG. 8.

Through the above calculation, the trajectory point, i. e. the numerical value of XYZ of the six-degree-of-freedom mechanical arm, can be obtained, but the posture of the mechanical arm has not been determined. In order to make the ultrasonic rolling tool head perpendicular to the blade surface in the strengthening process, it is necessary to calculate the movement posture of the mechanical arm. First, it is assumed that the blade calculates the included angle between the normal vector and the workpiece coordinate system according to the cutter-contact point CP and the tool location point LP through the vector formed by the connecting line between the tool location point and the cutter-contact point, that is, the normal vector of the tool along the curved surface. The included angle is finally converted into the ZYX Euler angle of the mechanical arm. The final executable data file of the mechanical arm is obtained through the combination of the trajectory point and the posture so as to be read by the control module.

For example, generating a first mechanical arm motion trajectory and a second mechanical arm motion trajectory according to a three-dimensional model of the blade specifically includes the following steps of: layering the three-dimensional model by taking data points with the same numerical values in a Z axis as a layer; dividing the data points of each layer into first plane data points and second plane data points according to a numerical value in a Y axis, where the first plane data points are the data points located on one side of the blade, and the second plane data points are the data points located on the other side of the blade; calculating first time points for the first plane data points when the end of the first mechanical arm subsystem moves to each of the first plane data points and calculating first time points for the second plane data points when the end of the second mechanical arm subsystem moves to each of the second plane data points, respectively; inserting multiple second time points for the first plane data points between two adjacent first time points of the first time points for the first plane data points, and inserting multiple second time points for the second plane data points between two adjacent first time points of the first time points for the second plane data points; forming the first mechanical arm motion trajectory of a layer where the first plane data points are located by the first time points for the first plane data points and the second time points for the first plane data points; forming the second mechanical arm motion trajectory of a layer where the second plane data points are located by the first time points for the second plane data points and the second time points for the second plane data points.

An action of a first mechanical arm subsystem is controlled according to the first mechanical arm motion trajectory.

An action of a second mechanical arm subsystem is controlled according to the second mechanical arm motion trajectory.

Processing depths of both sides of the blade as a first processing depth and a second processing depth, respectively, are determined according to the three-dimensional model of the blade.

An action of a first ultrasonic rolling strengthening subsystem is controlled according to the first processing depth.

An action of a second ultrasonic rolling strengthening subsystem is controlled according to the second processing depth.

In order to ensure the constant strengthening load, constant force coordination control is established, closed-loop adjustment is carried out by using the data of the six-component force sensor, and the gravity compensation algorithm is used to offset the influence of the gravity of the ultrasonic rolling tool head of the ultrasonic rolling strengthening subsystem in the processing process.

Specifically, the gravity of the ultrasonic rolling tool head measured in the world coordinate system and the initial value of the six-component force sensor are converted into the component force in the sensor coordinate system, that is, the conversion relationship between the sensor coordinate and the base coordinate is established.

The robot base coordinate system is denoted as $O_1$—$X_1Y_1Z_1$. It is assumed that $O_1$—$X_1Y_1Z_1$ can be obtained by rotating the angle U around the X axis and then rotating the angle V around the Y1 axis through the world coordinate system $O_0$—$X_0Y_0Z_0$. The posture transformation matrix from $O_1$—$X_1Y_1Z_1$ to $O_0$—$X_0Y_0Z_0$ is:

$$\,^0_1R = \begin{bmatrix} 1 & 0 & 0 \\ 0 & \cos U & -\sin U \\ 0 & \sin U & \cos U \end{bmatrix} \cdot \begin{bmatrix} \cos V & 0 & \sin V \\ 0 & 1 & 0 \\ -\sin V & 0 & \cos V \end{bmatrix} \quad (1)$$

Through coordinate transformation, the vector of the gravity G of the ultrasonic rolling tool head in the sensor coordinate system can be obtained as follows:

$$g_2 = \,^1_2R^T \cdot \,^0_1R^T \cdot g_0 = \,^1_2R^T \begin{bmatrix} G\cos U \sin V \\ -G\sin U \\ -G\cos U \cos V \end{bmatrix} \quad (2)$$

When the ultrasonic rolling tool head has not been in contact with the parts, the data obtained by the six-component force sensor are the component $[F_x, F_y, F_z]$ of the ultrasonic rolling tool head in the sensor coordinate system and the zero value $[F_{x_0}, F_{y_0}, F_{z_0}]$ of the six-component force sensor:

$$\begin{bmatrix} F_x \\ F_y \\ F_z \end{bmatrix} = \frac{1}{2} R^T \begin{bmatrix} G\cos U \sin V \\ -G\sin U \\ -G\cos U \cos V \end{bmatrix} + \begin{bmatrix} F_{x0} \\ F_{y0} \\ F_{z0} \end{bmatrix} \quad (3)$$

In order to avoid the ill-conditioned matrix when solving the above formula, it is necessary to have at least three pointing vectors at the end of the robot in the posture that are not coplanar. The values transformed from the initial force of the force sensor and the gravity of the tool changed with the posture are solved by multiple groups of posture values of the mechanical arm and values of the force sensor. Finally the actual contact force in the processing process can be obtained, which provides static pressure data for constant force control.

Through constant force coordination control, the data value of the force sensor is compared with the expected value, and the data point of the mechanical arm movement is finely adjusted according to the error value to change the error value, thus reducing the load change in the strengthening processing process. Specifically, the relationship between the force error value and the displacement is first established as shown in Formula (4). The displacement change value Δx of the mechanical arm corresponding to the force error value $F_e$ is obtained through the transformation and solution of Formula (4), and is added to the original offline trajectory in real time, so as to realize online real-time closed-loop adjustment.

$$M(\ddot{x}-\ddot{x}_d)+B(\dot{x}-\dot{x}_d)+K(x-x_d)=F_d(t)-F_m(t)=F_e \quad (4)$$

File reading realizes the acquisition of the off-line trajectory point data, which is converted into motion instructions by the control module to control the mechanical arm, so as to complete specific behaviors.

For example, controlling an action of a first ultrasonic rolling strengthening subsystem according to the first processing depth specifically includes:

obtaining pressure data acquired by a six-dimensional force sensor provided between the first mechanical arm subsystem and the first ultrasonic rolling strengthening subsystem;

performing gravity compensation on the pressure data by using the following formula to obtain compensated pressure data;

$$F_m'(t) = F_m(t) - g_2 - F_0;$$

where $F_m'(t)$ is the compensated pressure data, $F_m(t)$ is the acquired pressure data, t indicates a sampling time point, $g_2$ is a component of the gravity of the first ultrasonic rolling strengthening subsystem in a sensor coordinate system, and $F_0$ is a zero value of the six-component force sensor provided between the first mechanical arm subsystem and the first ultrasonic rolling strengthening subsystem;

controlling the action of the first ultrasonic rolling strengthening subsystem by using the following formula according to the compensated pressure data and the first processing depth based on a principle of constant force coordination control;

$$M(\ddot{x}-\ddot{x}_d)+B(\dot{x}-\dot{x}_d)+K(x-x_d)=F_d(t)-F_m'(t)=F_e;$$

where M, B and K are all coefficient matrices, N is a displacement in the X-axis direction, $x^d$ is an expected displacement determined by the first processing depth, and $F_d(t)$ is an expected pressure in constant force coordination control.

Embodiment 3

Figure 9:
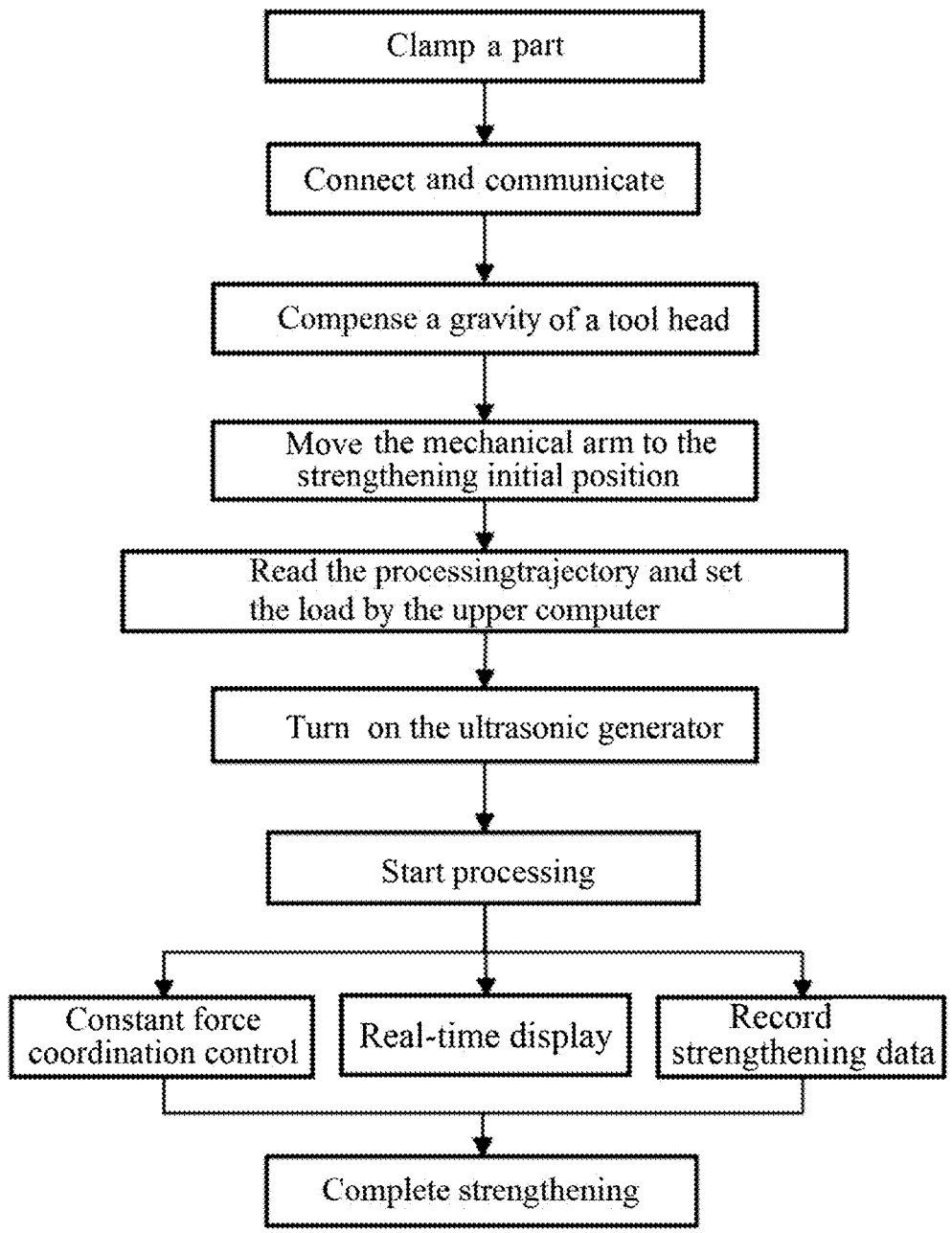
FIG. 9 is a flowchart of strengthening processing according to an embodiment of the present disclosure.

Embodiment 3 of the present disclosure provides a strengthening processing process based on the double-sided ultrasonic rolling cooperative strengthening system provided in Embodiment 1 and the control method provided in Embodiment 2. As shown in FIG. 9, the processing process includes the following steps.

(1) The blade to be strengthened is clamped to the strengthening fixture.

(2) The mechanical arm mode is converted into an automatic mode, and the upper computer establishes communication with the mechanical arm control cabinet and the six-component force sensor through the communication module.

(3) The control module controls the mechanical arm for gravity compensation. First, the postures of multiple groups of mechanical arms are preset in the upper computer program. The control module of the upper computer sends a motion instruction to the control cabinet to control the motion of the six-degree-of-freedom mechanical arm. Every time the six-degree-of-freedom mechanical arm reaches a posture, the upper computer automatically records the current six-component force sensor data value and the mechanical arm posture value. After all postures are arrived, the upper computer automatically calculates the gravity compensation result to complete the gravity compensation, so as to offset the static pressure interference resulted from the gravity of the ultrasonic rolling tool head. At this time, the data of the six-component force sensor after gravity compensation is the static pressure generated by the contact between the ultrasonic rolling tool and the blade, which is used as the input of constant force coordination control in the subsequent processing process.

(4) After gravity compensation is completed, the upper computer sends a motion instruction to the control cabinet to control the mechanical arm to move to the strengthening start position.

(5) Thereafter, the processing trajectory file generated by the above described trajectory planning is read in the upper computer, and the expected static pressure load is set as the reference value of the ultrasonic rolling load in the processing process.

(6) The power supply of the ultrasonic generator is turned on, and the amplitude parameters are set to change the output amplitude of the ultrasonic rolling tool head in the strengthening process.

(7) Strengthening processing starts, constant force coordination control in the control module is used to convert the difference between the actual static pressure of the sensor and the expected load set in step (6) into the displacement value of the mechanical arm in real time and superimpose the difference on the processing trajectory read in step (6), and then the motion trajectory data is sent to the mechanical arm control cabinet in real time through the communication module to control the movement of the six-degree-of-freedom mechanical arm. During the movement, the display module of the upper computer can display the position and posture of the current mechanical arm and the data of the sensor in real time, while a file storage module in the control module records the corresponding data in real time, such as the position and posture of the current mechanical arm and the data of the force sensor, until the whole strengthening process is finally completed.

In this embodiment, two six-degree-of-freedom mechanical arms equipped with ultrasonic rolling tools are combined with the self-developed control system to carry out strengthening processing on the blade. When the user carries out strengthening processing for the first time, the ultrasonic rolling tool head is fixed with the end of the six-degree-of-freedom mechanical arm through a bolt. Secondly, according to the clamping mode of the blade in FIG. 3, the blade is fixed through a bolt to ensure that the blade will not move in the processing process. After the clamping process is completed, the control process is started. The six-degree-of-freedom mechanical arm is set as the automatic mode. The control program is turned on. Communication is established with the six-degree-of-freedom mechanical arm and the six-component force sensor. The six-degree-of-freedom mechanical arm needs to be controlled to complete the gravity compensation in the new state through the control module under the condition that the ultrasonic rolling tool head is disassembled and assembled. The six-degree-of-freedom mechanical arm is controlled to move to the blade strengthening start position. The offline planning processing trajectory is read by clicking operation. When the load is set to 200N, the strengthening processing starts, the ultrasonic gear is set to 10%, and a processing lubrication device is turned on. The state of the current strengthening process can be read through the display interface. After the strengthening process is completed, the mechanical arm will stop moving in situ, and the program is turned off, so as to obtain the detailed processing data information in the processing process. The processing data information can be used for subsequent data analysis.

After the strengthening process is completed, the surface integrity of the part after being subjected to ultrasonic rolling strengthening is tested using a three-dimensional profilometer, XRD and other instruments. The results are good and are improved compared with the original unstrengthening state of the part, and are significantly improved after the verification of the fatigue life. It shows that the invented system suitable for ultrasonic rolling strengthening of a compressor blade of an aero-engine meets the requirements of blade strengthening processing.

Embodiment 4

Figure 10:
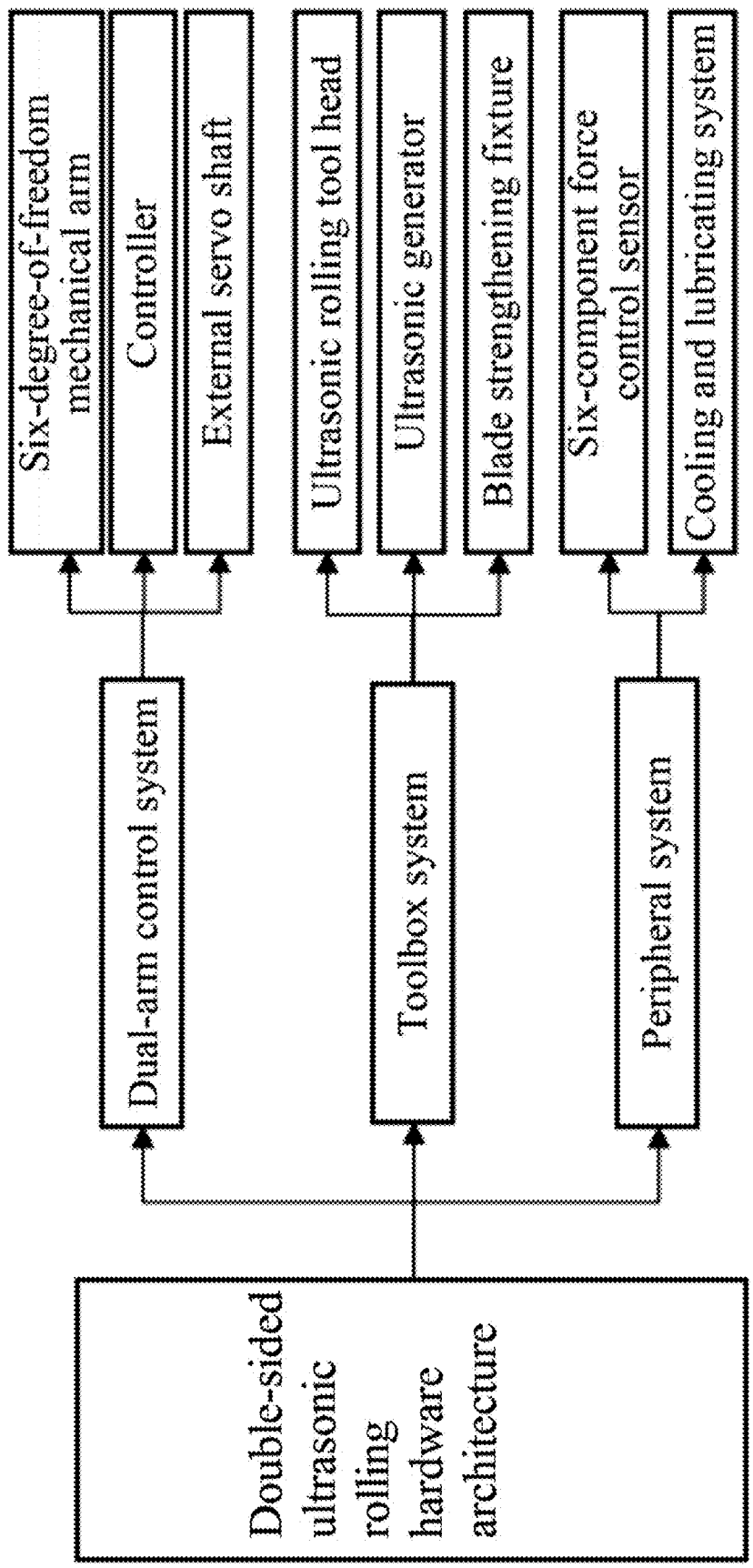
FIG. 10 is an overall arrangement diagram of strengthening processing based on double-sided ultrasonic rolling cooperative strengthening according to an embodiment of the present disclosure.

Embodiment 4 of the present disclosure provides an overall arrangement of strengthening processing based on double-sided ultrasonic rolling cooperative strengthening. As shown in FIG. 10, the overall arrangement includes a mechanical arm control subsystem, an ultrasonic rolling strengthening subsystem, and an auxiliary processing subsystem.

The mechanical arm control subsystem includes a six-degree-of-freedom mechanical arm, a controller and an additional external servo turntable, which are the main parts of the system movement. The movement of the mechanical arm is controlled by the controller.

The ultrasonic rolling strengthening subsystem includes an ultrasonic rolling tool and an ultrasonic rolling generating device, which are the main tools for surface strengthening and are in direct contact with the surface of the workpiece.

The auxiliary processing subsystem includes: a six-component force sensor, which is configured to acquire the processing load data in real time and feed the processing load data back to the control system; and a lubrication system, which is configured to ensure the surface quality in the strengthening process.

According to the present disclosure, the surface quality and the surface integrity of the thin-walled blade are improved and the fatigue life is prolonged through the double-sided ultrasonic rolling cooperative strengthening technology, which is an important idea of the present disclosure. The technical effects of the present disclosure are as follows: (1) compared with the existing device, the degree of freedom and the efficiency of the whole processing are improved; (2) ultrasonic rolling introduces a residual compressive stress and refines grains on the surface of the thin-walled blade, the overall surface integrity and the service life are improved, and the procedure of improving the surface roughness, such as manual polishing, is omitted; (3) the ultrasonic rolling strengthening device improves the strengthening efficiency of the thin-walled blade, applies the same amount of forces on both sides of the thin-walled blade for simultaneous strengthening, which support each other without supporting devices, thus saving the processes of disassembling and assembling the supporting devices and adjusting the rotary table, reducing the steps that result in errors easily and reducing the possibility of deformation; (4) the ultrasonic rolling tool head, that will wear after being processed for a certain period of time, and is a consumable product, is connected with the amplitude transformer by a thread, which is convenient for replacement and can reduce the installation errors; (5) compared with the traditional mechanical arm where it is not easy to move in a complicated path by teaching, the whole system can save manual adjustment; (6) in the whole control process, a force feedback is introduced to form closed-loop control, so as to ensure that the rolling strengthening device can be in compliant contact with the thin-walled blade, control the contact force in the expected range, and ensure the strengthening quality.

In this specification, various embodiments are described in a progressive way. The differences between each embodiment and other embodiments are highlighted, and the same and similar parts of various embodiments can be referred to each other.

In the present disclosure, specific examples are applied to illustrate the principle and implementation of the present disclosure, and the explanations of the above embodiments are only used to help understand the method and core ideas of the present disclosure. At the same time, according to the idea of the present disclosure, there will be some changes in the specific implementation and application scope for those skilled in the art. To sum up, the contents of the specification should not be construed as limiting the present disclosure.

What is claimed is:

1. A double-sided ultrasonic rolling cooperative strengthening system, wherein the system comprises a first mechanical arm subsystem, a second mechanical arm subsystem, a first ultrasonic rolling strengthening subsystem, a second ultrasonic rolling strengthening subsystem and a servo turntable;

the servo turntable is configured to fix a blade to be processed;

the first ultrasonic rolling strengthening subsystem is provided at an end of the first mechanical arm subsystem;

the second ultrasonic rolling strengthening subsystem is provided at an end of the second mechanical arm subsystem;

the first mechanical arm subsystem is configured to drive the first ultrasonic rolling strengthening subsystem to carry out strengthening processing on one side of the blade, and the second mechanical arm subsystem is configured to drive the second ultrasonic rolling strengthening subsystem to carry out strengthening processing on an other side of the blade;

wherein the system further comprises a strengthening fixture;
the servo turntable is configured to fix the blade through the strengthening fixture;
wherein a bottom of the strengthening fixture is provided with a cross-shaped clamping groove, the cross-shaped clamping groove is aligned with a cross-shaped claw provided on the servo turntable and is fixed with the cross-shaped claw through a bolt;
a top of the strengthening fixture is provided with a groove, a first threaded hole is provided at a top surface around the groove, a second threaded hole is provided at a side surface of the groove; the top of the strengthening fixture is further provided with a gland, and a center of the gland is provided with a through hole;
during operation, a tenon root of the blade is provided in the groove, the gland is fastened with the first threaded hole through a bolt, the blade passes through the through hole, the gland is configured to limit movement of the blade in a Z-axis direction; a bolt is screwed into the second threaded hole for limiting movement of the blade in an X-axis direction and a Y-axis direction; the Z-axis direction is a strengthening feeding direction, the X-axis direction is a thickness direction of the blade, and the Y-axis direction is a direction perpendicular to the Z-axis direction and the X-axis direction.

2. The double-sided ultrasonic rolling cooperative strengthening system according to claim 1, wherein each of the first mechanical arm subsystem and the second mechanical arm subsystem comprises a six-degree-of-freedom mechanical arm.

3. The double-sided ultrasonic rolling cooperative strengthening system according to claim 1, wherein a six-component force sensor is provided between the first mechanical arm subsystem and the first ultrasonic rolling strengthening subsystem, and an other six-component force sensor is provided between the second mechanical arm subsystem and the second ultrasonic rolling strengthening subsystem.

4. The double-sided ultrasonic rolling cooperative strengthening system according to claim 3, wherein each of the first ultrasonic rolling strengthening subsystem and the second ultrasonic rolling strengthening subsystem comprises an ultrasonic rolling tool head and an ultrasonic generator;
the ultrasonic generator is connected with an ultrasonic transducer in the ultrasonic rolling tool head, and the ultrasonic generator is configured to generate a signal with a preset frequency.

5. The double-sided ultrasonic rolling cooperative strengthening system according to claim 4, wherein the ultrasonic rolling tool head comprises a sleeve, a transducer pressure plate, the ultrasonic transducer, an amplitude transformer, a holder and a roller;
the sleeve is connected with the six-component force sensor provided between the first mechanical arm subsystem and the first ultrasonic rolling strengthening subsystem and with the other six-component force sensor provided between the second mechanical arm subsystem and the second ultrasonic rolling strengthening subsystem through bolts, a driving end of the ultrasonic transducer is connected with the ultrasonic generator, and an mechanical energy output end of the ultrasonic transducer is connected with one end of the amplitude transformer through a double headed bolt;
the driving end of the ultrasonic transducer is located in the sleeve, and the transducer pressure plate is connected with the sleeve through a bolt for limiting relative movement between the ultrasonic transducer and the sleeve;
an other end of the amplitude transformer is connected with the roller through the holder.

6. A control method of the double-sided ultrasonic rolling cooperative strengthening system according to claim 1, and the method comprises following steps:
fixing the blade to be processed on the servo turntable;
generating a first mechanical arm motion trajectory and a second mechanical arm motion trajectory according to a three-dimensional model of the blade;
controlling an action of the first mechanical arm subsystem according to the first mechanical arm motion trajectory;
controlling an action of the second mechanical arm subsystem according to the second mechanical arm motion trajectory;
determining processing depths of both sides of the blade as a first processing depth and a second processing depth, respectively, according to the three-dimensional model of the blade;
controlling an action of the first ultrasonic rolling strengthening subsystem according to the first processing depth;
controlling an action of the second ultrasonic rolling strengthening subsystem according to the second processing depth.

7. The control method of the double-sided ultrasonic rolling cooperative strengthening system according to claim 6, wherein generating the first mechanical arm motion trajectory and the second mechanical arm motion trajectory according to the three-dimensional model of the blade specifically comprises following steps:
layering the three-dimensional model by taking data points with same numerical values in a Z axis as a layer;
dividing the data points of each layer into first plane data points and second plane data points according to a numerical value in a Y axis, wherein the first plane data points are data points located on the one side of the blade, and the second plane data points are data points located on the other side of the blade;
calculating first time points for the first plane data points when the end of the first mechanical arm subsystem moves to each of the first plane data points and calculating first time points for the second plane data points when the end of the second mechanical arm subsystem moves to each of the second plane data points, respectively;
inserting a plurality of second time points for the first plane data points between two adjacent first time points of the first time points for the first plane data points, and inserting a plurality of second time points for the second plane data points between two adjacent first time points of the first time points for the second plane data points;
forming the first mechanical arm motion trajectory of a layer where the first plane data points are located by the first time points for the first plane data points and the second time points for the first plane data points;
forming the second mechanical arm motion trajectory of a layer where the second plane data points are located by the first time points for the second plane data points and the second time points for the second plane data points.

8. The control method of the double-sided ultrasonic rolling cooperative strengthening system according to claim 6, wherein controlling the action of the first ultrasonic rolling strengthening subsystem according to the first processing depth specifically comprises following steps:

obtaining pressure data acquired by a six-component force sensor provided between the first mechanical arm subsystem and the first ultrasonic rolling strengthening subsystem;

performing gravity compensation on the pressure data by using following formula to obtain compensated pressure data;

$$F_m'(t)=F_m(t)-g_2-F_0;$$

wherein $F_m'(t)$ is the compensated pressure data, $F_m(t)$ is the acquired pressure data, t indicates a sampling time point, $g_2$ is a component of a gravity of the first ultrasonic rolling strengthening subsystem in a sensor coordinate system, and $F_0$ is a zero value of the six-component force sensor provided between the first mechanical arm subsystem and the first ultrasonic rolling strengthening subsystem;

controlling the action of the first ultrasonic rolling strengthening subsystem by using following formula according to the compensated pressure data and the first processing depth based on a principle of constant force coordination control;

$$M(\ddot{x}-\ddot{x}_d)+B(\dot{x}-\dot{x}_d)+K(x-x_d)=F_d(t)-F_m'(t)=F_e;$$

wherein M, B and K are all coefficient matrices, x is a displacement in the X-axis direction, $x_d$ is an expected displacement determined by the first processing depth, $F_d(t)$ is an expected pressure in the constant force coordination control, and $F_e$ is a pressure deviation.

9. A control method of the double-sided ultrasonic rolling cooperative strengthening system according to claim 2, and the method comprises following steps:

fixing the blade to be processed on the servo turntable;

generating a first mechanical arm motion trajectory and a second mechanical arm motion trajectory according to a three-dimensional model of the blade;

controlling an action of the first mechanical arm subsystem according to the first mechanical arm motion trajectory;

controlling an action of the second mechanical arm subsystem according to the second mechanical arm motion trajectory;

determining processing depths of both sides of the blade as a first processing depth and a second processing depth, respectively, according to the three-dimensional model of the blade;

controlling an action of the first ultrasonic rolling strengthening subsystem according to the first processing depth;

controlling an action of the second ultrasonic rolling strengthening subsystem according to the second processing depth.

10. A control method of the double-sided ultrasonic rolling cooperative strengthening system according to claim 3, and the method comprises following steps:

fixing the blade to be processed on the servo turntable;

generating a first mechanical arm motion trajectory and a second mechanical arm motion trajectory according to a three-dimensional model of the blade;

controlling an action of the first mechanical arm subsystem according to the first mechanical arm motion trajectory;

controlling an action of the second mechanical arm subsystem according to the second mechanical arm motion trajectory;

determining processing depths of both sides of the blade as a first processing depth and a second processing depth, respectively, according to the three-dimensional model of the blade;

controlling an action of the first ultrasonic rolling strengthening subsystem according to the first processing depth;

controlling an action of the second ultrasonic rolling strengthening subsystem according to the second processing depth.

11. A control method of the double-sided ultrasonic rolling cooperative strengthening system according to claim 4, and the method comprises following steps:

fixing the blade to be processed on the servo turntable;

generating a first mechanical arm motion trajectory and a second mechanical arm motion trajectory according to a three-dimensional model of the blade;

controlling an action of the first mechanical arm subsystem according to the first mechanical arm motion trajectory;

controlling an action of the second mechanical arm subsystem according to the second mechanical arm motion trajectory;

determining processing depths of both sides of the blade as a first processing depth and a second processing depth, respectively, according to the three-dimensional model of the blade;

controlling an action of the first ultrasonic rolling strengthening subsystem according to the first processing depth;

controlling an action of the second ultrasonic rolling strengthening subsystem according to the second processing depth.

12. A control method of the double-sided ultrasonic rolling cooperative strengthening system according to claim 5, and the method comprises following steps:

fixing the blade to be processed on the servo turntable;

generating a first mechanical arm motion trajectory and a second mechanical arm motion trajectory according to a three-dimensional model of the blade;

controlling an action of the first mechanical arm subsystem according to the first mechanical arm motion trajectory;

controlling an action of the second mechanical arm subsystem according to the second mechanical arm motion trajectory;

determining processing depths of both sides of the blade as a first processing depth and a second processing depth, respectively, according to the three-dimensional model of the blade;

controlling an action of the first ultrasonic rolling strengthening subsystem according to the first processing depth;

controlling an action of the second ultrasonic rolling strengthening subsystem according to the second processing depth.

13. The control method of the double-sided ultrasonic rolling cooperative strengthening system according to claim 9, wherein generating the first mechanical arm motion trajectory and the second mechanical arm motion trajectory according to the three-dimensional model of the blade specifically comprises following steps:

layering the three-dimensional model by taking data points with same numerical values in a Z axis as a layer;

dividing the data points of each layer into first plane data points and second plane data points according to a numerical value in a Y axis, wherein the first plane data points are data points located on the one side of the blade, and the second plane data points are data points located on the other side of the blade;

calculating first time points for the first plane data points when the end of the first mechanical arm subsystem moves to each of the first plane data points and calculating first time points for the second plane data points when the end of the second mechanical arm subsystem moves to each of the second plane data points, respectively;

inserting a plurality of second time points for the first plane data points between two adjacent first time points of the first time points for the first plane data points, and inserting a plurality of second time points for the second plane data points between two adjacent first time points of the first time points for the second plane data points;

forming the first mechanical arm motion trajectory of a layer where the first plane data points are located by the first time points for the first plane data points and the second time points for the first plane data points;

forming the second mechanical arm motion trajectory of a layer where the second plane data points are located by the first time points for the second plane data points and the second time points for the second plane data points.

14. The control method of the double-sided ultrasonic rolling cooperative strengthening system according to claim 10, wherein generating the first mechanical arm motion trajectory and the second mechanical arm motion trajectory according to the three-dimensional model of the blade specifically comprises following steps:

layering the three-dimensional model by taking data points with same numerical values in a Z axis as a layer;

dividing the data points of each layer into first plane data points and second plane data points according to a numerical value in a Y axis, wherein the first plane data points are data points located on the one side of the blade, and the second plane data points are data points located on the other side of the blade;

calculating first time points for the first plane data points when the end of the first mechanical arm subsystem moves to each of the first plane data points and calculating first time points for the second plane data points when the end of the second mechanical arm subsystem moves to each of the second plane data points, respectively;

inserting a plurality of second time points for the first plane data points between two adjacent first time points of the first time points for the first plane data points, and inserting a plurality of second time points for the second plane data points between two adjacent first time points of the first time points for the second plane data points;

forming the first mechanical arm motion trajectory of a layer where the first plane data points are located by the first time points for the first plane data points and the second time points for the first plane data points;

forming the second mechanical arm motion trajectory of a layer where the second plane data points are located by the first time points for the second plane data points and the second time points for the second plane data points.

15. The control method of the double-sided ultrasonic rolling cooperative strengthening system according to claim 11, wherein generating the first mechanical arm motion trajectory and the second mechanical arm motion trajectory according to the three-dimensional model of the blade specifically comprises following steps:

layering the three-dimensional model by taking data points with same numerical values in a Z axis as a layer;

dividing the data points of each layer into first plane data points and second plane data points according to a numerical value in a Y axis, wherein the first plane data points are data points located on the one side of the blade, and the second plane data points are data points located on the other side of the blade;

calculating first time points for the first plane data points when the end of the first mechanical arm subsystem moves to each of the first plane data points and calculating first time points for the second plane data points when the end of the second mechanical arm subsystem moves to each of the second plane data points, respectively;

inserting a plurality of second time points for the first plane data points between two adjacent first time points of the first time points for the first plane data points, and inserting a plurality of second time points for the second plane data points between two adjacent first time points of the first time points for the second plane data points;

forming the first mechanical arm motion trajectory of a layer where the first plane data points are located by the first time points for the first plane data points and the second time points for the first plane data points;

forming the second mechanical arm motion trajectory of a layer where the second plane data points are located by the first time points for the second plane data points and the second time points for the second plane data points.

16. The control method of the double-sided ultrasonic rolling cooperative strengthening system according to claim 12, wherein generating the first mechanical arm motion trajectory and the second mechanical arm motion trajectory according to the three-dimensional model of the blade specifically comprises following steps:

layering the three-dimensional model by taking data points with same numerical values in a Z axis as a layer;

dividing the data points of each layer into first plane data points and second plane data points according to a numerical value in a Y axis, wherein the first plane data points are data points located on the one side of the blade, and the second plane data points are data points located on the other side of the blade;

calculating first time points for the first plane data points when the end of the first mechanical arm subsystem moves to each of the first plane data points and calculating first time points for the second plane data points when the end of the second mechanical arm subsystem moves to each of the second plane data points, respectively;

inserting a plurality of second time points for the first plane data points between two adjacent first time points of the first time points for the first plane data points, and inserting a plurality of second time points for the second plane data points between two adjacent first time points of the first time points for the second plane data points;

forming the first mechanical arm motion trajectory of a layer where the first plane data points are located by the first time points for the first plane data points and the second time points for the first plane data points;

forming the second mechanical arm motion trajectory of a layer where the second plane data points are located by the first time points for the second plane data points and the second time points for the second plane data points.

17. The control method of the double-sided ultrasonic rolling cooperative strengthening system according to claim 9, wherein controlling the action of the first ultrasonic rolling strengthening subsystem according to the first processing depth specifically comprises following steps:

obtaining pressure data acquired by a six-component force sensor provided between the first mechanical arm subsystem and the first ultrasonic rolling strengthening subsystem;

performing gravity compensation on the pressure data by using following formula to obtain compensated pressure data;

$$F_m'(t)=F_m(t)-g_2-F_0;$$

wherein $F_m'(t)$ is the compensated pressure data, $F_m(t)$ is the acquired pressure data, t indicates a sampling time point, $g_2$ is a component of a gravity of the first ultrasonic rolling strengthening subsystem in a sensor coordinate system, and $F_0$ is a zero value of the six-component force sensor provided between the first mechanical arm subsystem and the first ultrasonic rolling strengthening subsystem;

controlling the action of the first ultrasonic rolling strengthening subsystem by using following formula according to the compensated pressure data and the first processing depth based on a principle of constant force coordination control;

$$M(\ddot{x}-\ddot{x}_d)+B(\dot{x}-\dot{x}_d)+K(x-x_d)=F_d(t)-F_m'(t)=F_e;$$

wherein M, B and K are all coefficient matrices, x is a displacement in the X-axis direction, $x_d$ is an expected displacement determined by the first processing depth, $F_d(t)$ is an expected pressure in the constant force coordination control, and $F_e$ is a pressure deviation.

18. The control method of the double-sided ultrasonic rolling cooperative strengthening system according to claim 10, wherein controlling the action of the first ultrasonic rolling strengthening subsystem according to the first processing depth specifically comprises following steps:

obtaining pressure data acquired by the six-component force sensor provided between the first mechanical arm subsystem and the first ultrasonic rolling strengthening subsystem;

performing gravity compensation on the pressure data by using following formula to obtain compensated pressure data;

$$F_m'(t)=F_m(t)-g_2-F_0;$$

wherein $F_m'(t)$ is the compensated pressure data, $F_m(t)$ is the acquired pressure data, t indicates a sampling time point, $g_2$ is a component of a gravity of the first ultrasonic rolling strengthening subsystem in a sensor coordinate system, and $F_0$ is a zero value of the six-component force sensor provided between the first mechanical arm subsystem and the first ultrasonic rolling strengthening subsystem;

controlling the action of the first ultrasonic rolling strengthening subsystem by using following formula according to the compensated pressure data and the first processing depth based on a principle of constant force coordination control;

$$M(\ddot{x}-\ddot{x}_d)+B(\dot{x}-\dot{x}_d)+K(x-x_d)=F_d(t)-F_m'(t)=F_e;$$

wherein M, B and K are all coefficient matrices, x is a displacement in the X-axis direction, $x_d$ is an expected displacement determined by the first processing depth, $F_d(t)$ is an expected pressure in the constant force coordination control, and $F_e$ is a pressure deviation.

19. The control method of the double-sided ultrasonic rolling cooperative strengthening system according to claim 11, wherein controlling the action of the first ultrasonic rolling strengthening subsystem according to the first processing depth specifically comprises following steps:

obtaining pressure data acquired by the six-component force sensor provided between the first mechanical arm subsystem and the first ultrasonic rolling strengthening subsystem;

performing gravity compensation on the pressure data by using following formula to obtain compensated pressure data;

$$F_m'(t)=F_m(t)-g_2-F_0;$$

wherein $F_m'(t)$ is the compensated pressure data, $F_m(t)$ is the acquired pressure data, t indicates a sampling time point, $g_2$ is a component of a gravity of the first ultrasonic rolling strengthening subsystem in a sensor coordinate system, and $F_0$ is a zero value of the six-component force sensor provided between the first mechanical arm subsystem and the first ultrasonic rolling strengthening subsystem;

controlling the action of the first ultrasonic rolling strengthening subsystem by using following formula according to the compensated pressure data and the first processing depth based on a principle of constant force coordination control;

$$M(\ddot{x}-\ddot{x}_d)+B(\dot{x}-\dot{x}_d)+K(x-x_d)=F_d(t)-F_m'(t)=F_e;$$

wherein M, B and K are all coefficient matrices, x is a displacement in the X-axis direction, $x_d$ is an expected displacement determined by the first processing depth, $F_d(t)$ is an expected pressure in the constant force coordination control, and $F_e$ is a pressure deviation.

20. The control method of the double-sided ultrasonic rolling cooperative strengthening system according to claim 12, wherein controlling the action of the first ultrasonic rolling strengthening subsystem according to the first processing depth specifically comprises following steps:

obtaining pressure data acquired by the six-component force sensor provided between the first mechanical arm subsystem and the first ultrasonic rolling strengthening subsystem;

performing gravity compensation on the pressure data by using following formula to obtain compensated pressure data;

$$F_m'(t)=F_m(t)-g_2-F_0;$$

wherein $F_m'(t)$ is the compensated pressure data, $F_m(t)$ is the acquired pressure data, t indicates a sampling time point, $g_2$ is a component of a gravity of the first ultrasonic rolling strengthening subsystem in a sensor coordinate system, and $F_0$ is a zero value of the six-component force sensor provided between the first mechanical arm subsystem and the first ultrasonic rolling strengthening subsystem;

controlling the action of the first ultrasonic rolling strengthening subsystem by using following formula according to the compensated pressure data and the first processing depth based on a principle of constant force coordination control;

$$M(\ddot{x}-\ddot{x}_d)+B(\dot{x}-\dot{x}_d)+K(x-x_d)=F_d(t)-F_m'(t)=F_e;$$

wherein M, B and K are all coefficient matrices, x is a displacement in the X-axis direction, $x_d$ is an expected displacement determined by the first processing depth, $F_d(t)$ is an expected pressure in the constant force coordination control, and $F_e$ is a pressure deviation.

* * * * *